(12) United States Patent
Akiyama

(10) Patent No.: US 6,423,126 B1
(45) Date of Patent: Jul. 23, 2002

(54) LESS OUTGAS GENERATING ANTICORROSIVE COMPOSITION FOR HDD

(75) Inventor: Motoharu Akiyama, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/537,990

(22) Filed: Mar. 29, 2000

(30) Foreign Application Priority Data

Oct. 8, 1999 (JP) ............................................. 11-323078

(51) Int. Cl.$^7$ ...................... C10M 105/48; C23F 11/00
(52) U.S. Cl. ................. 106/14.41; 106/14.42; 106/14.43; 106/311; 252/364; 252/388; 252/395; 252/396; 508/390; 508/462
(58) Field of Search ........................... 106/14.05, 14.41, 106/14.42, 14.43, 311; 252/364, 388, 395, 396; 508/390, 462

(56) References Cited

FOREIGN PATENT DOCUMENTS

| JP | 9-316480 | * | 9/1997 |
| JP | 11-116980 | | 4/1999 |
| JP | 11-325086 | | 11/1999 |

* cited by examiner

*Primary Examiner*—Anthony Green
(74) *Attorney, Agent, or Firm*—Flynn, Thiel, Boutell & Tanis, P.C.

(57) ABSTRACT

There is provided an anticorrosive composition for a memory unit bearing so as to control outgas generation which would cause magnetic head crushing or memory error. The anticorrosive composition for a memory unit bearing contains a carbonic ester represented by the following formula:

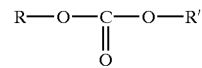

wherein R and R' are branched alkyl groups of 13 to 15 carbon atoms and may either be the same or different.

21 Claims, No Drawings

LESS OUTGAS GENERATING ANTICORROSIVE COMPOSITION FOR HDD

BACKGROUND OF THE INVENTION

1. Field of the Invention

This invention relates to an anticorrosive composition for a memory unit bearing, an anticorrosive solvent composition for a memory unit bearing containing said anticorrosive composition, a bearing part or bearing which surface is treated with said anticorrosive solvent composition, and a spindle motor, hard disk drive (HDD) device and etc. in which the thus surface-treated bearing part or bearing with said anticorrosive solvent composition is built-in.

2. Description of the Related Art

Miniaturization, speed-up and mass memorization of magnetic memory units, such as a hard disk drive (HDD) device, floppy disk drive (FDD) device and optical disk device, have been unexpectedly accelerated.

In order to meet such an accelerated condition, spindle motors used in HDD, FDD or optical disk are driven at increasingly higher rotary speeds, while the disk memory is more and more densified.

An outgas is generated through high speed rotation and should be controlled to the utmost so as to prevent possible crushing of the magnetic heads or memory error.

The outgas control is one of the problems to be solved to highly increase the memory density.

Although the outgas is derived from adhesives used in or dirt adhered to these devices, it has been found that a considerable amount of outgas is generated particularly from sealing grease for a motor bearing, an anticorrosive agent contained in the grease, etc.

It is an object of the present invention to improvably reduce outgas from an anticorrosive agent used for inhibiting metal corrosion of a bearing assembly such as inner and outer rings, balls, etc., and to provide a less outgas generating anticorrosive composition for a memory unit bearing, an anticorrosive solvent composition for a memory unit bearing containing said anticorrosive composition, a bearing part or bearing which surface is treated with said anticorrosive solvent composition, and a spindle motor, hard disk drive (HDD) device and etc. in which the thus surface-treated bearing part or bearing with said anticorrosive solvent composition is built-in.

The above mentioned inner and outer rings, balls, etc., as the bearing assembly, are subjected to washing processes to remove dirt after a machining step, before an assembling process and between the assembling and a grease sealing processes, respectively.

The dirt comprises oils, dusts, various organic compounds, ionic contaminants, etc. caused by the machining thereof, while the washing liquid is suitably selected depending on the kind of dirt to be removed.

It should be noted that oil is removed by washing the surface of each part, while the surface is active and easily corroded when the part is made of an iron material. It is thus necessary to provide a corrosion inhibiting process after the washing process.

In general, there is provided a corrosion inhibiting process in which a bearing is soaked in a diluted anticorrosive agent bath of 1 to 5% by volume after a drying step and before a rinsing step of the washing process.

One of an anticorrosive agent conventionally used in the above mentioned corrosion inhibiting process includes an anticorrosive lubricant comprising a diester or polyol ester as a main component.

It has been found, however, that any of such conventional anticorrosive lubricants results in a considerable amount of outgas due to the high volatility thereof.

SUMMARY OF THE INVENTION

The inventors have eagerly investigated to solve the above mentioned problems and finally found that a combined composition of a low volatility carbonic ester as a main component and an absorption type anticorrosive additive can control the outgas generation, thereby the present invention being achieved. Sorbitan ester anticorrosive agents are desirable as the absorption type anticorrosive additive.

Low volatility carbonic esters used in the present invention are represented by the following formula:

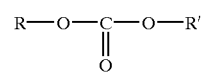

wherein R and R' are branched alkyl group of 13 to 15 carbon atoms and may either be the same or different.

DESCRIPTION OF THE PREFERRED EMBODIMENT

A typical example of the carbonic ester compounds used in the present invention as the main component is represented by the following formula:

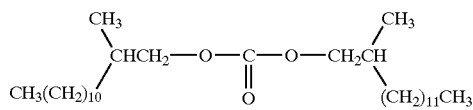

Further, there may also be used other carbonic ester compounds having branched alkyl groups R and R' represented by the following formula:

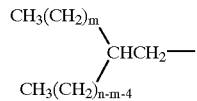

wherein n and m are an integer of 13 to 15 and 0 to 6, respectively, R and R' being the same or different.

Anticorrosive agents are mainly classified into two groups, i.e., non-absorption type and absorption type anticorrosive agents.

An anticorrosive additive used in the present invention is the absorption type and includes anticorrosive agents of sorbitan ester, carbonxylic acid, carboxylic acid salt, sulfonic salt, amine, phosphorus and phosphoric compounds.

The sorbitan ester anticorrosive agent used in the present invention includes sorbitan monolaurate, sorbitan trilaurate, sorbitan monostearate, sorbitan tristearate, sorbitan monooleate, sorbitan trioleate and the like, which may be used independently or as a combination of two or more.

The carboxylic acid anticorrosive agent used in the present invention includes undecanoic acid, myristic acid, stearic acid, dodecylphenylstearic acid, p-n-dodecyloxybenzoic acid, α-hydroxypalmitic acid and the like, while the carboxylic acid-salt anticorrosive agent includes Zn laurate, Zn naphthenate, Ba phenylstearate, Ca naphthenate, etc.

The sulfonic salt anticorrosive agent used in the present invention includes Ba petroleum sulfonate, Ca petroleum sulfonate, etc., while the amine and the phosphorus anticorrosive agents include octadecenyl amine, cyclohexyl amine, etc., and tri-P-cresylphosphate, cetyl methyl-acid phosphate, etc., respectively.

In particular, the absorption type anticorrosive additive preferably used in the present invention is a sorbitan ester anticorrosive agent.

An anticorrosive composition for a memory device bearing of the present invention may comprise various kinds of stabilizing agents, antioxidants, surfactants, etc. in an amount practically used by those skilled in the art.

An embodiment of the present invention will be described in the following.

(1) An anticorrosive composition for a memory unit bearing comprising a carbonic ester represented by the following formula:

$$R-O-\underset{\underset{O}{\|}}{C}-O-R'$$

wherein R and R' are branched alkyl groups of 13 to 15 carbon atoms and may either be the same or different, and an absorption type anticorrosive additive.

(2) An anticorrosive composition for a memory unit bearing described in the above item (1) in which the absorption type anticorrosive additive is a sorbitan ester anticorrosive agent.

(3) An anticorrosive solvent composition prepared by adding an anticorrosive composition for a memory unit bearing comprising a carbonic ester represented by the following formula:

$$R-O-\underset{\underset{O}{\|}}{C}-O-R'$$

wherein R and R' are branched alkyl groups of 13 to 15 carbon atoms and may either be the same or different, and a sorbitan ester anticorrosive agent as a main component, to a volatile solvent in an amount of 1 to 10% by volume.

(4) An anticorrosive composition or an anticorrosive solvent composition for a memory unit bearing described in any of items (1) to (3) comprising a carbonic ester having branched alkyl groups R and R' represented by the following formula:

$$\underset{CH_3(CH_2)_{n-m-4}}{\overset{CH_3(CH_2)_m}{\diagdown}}CHCH_2-$$

wherein n and m are an integer of 13 to 15 and 0 to 6, respectively, R and R' being the same or different.

(5) A memory unit bearing or bearing part in which an anticorrosive film is formed on a surface thereof by means of an anticorrosive solvent composition for a memory unit bearing which is prepared by adding an anticorrosive composition for a memory unit bearing comprising a carbonic ester and sorbitan ester, as a main component, to a volatile solvent in an amount of 1 to 10% by volume.

(6) A spindle motor or hard disk unit is provided with a memory unit bearing or bearing part having its surface covered with an anticorrosive film by means of an anticorrosive solvent composition for a memory unit bearing which is prepared by adding an anticorrosive composition for a memory unit bearing comprising a carbonic ester and sorbitan ester, as a main component, to a volatile solvent in an amount of 1 to 10% by volume.

(7) An anticorrosive composition for a memory unit bearing, anticorrosive solvent composition for a memory unit bearing, a memory unit bearing or bearing part, spindle motor or hard disk unit as described in any of items 1 to 6 comprising 90 to 99% by volume of a carbonic ester and 10 to 1% by volume of a sorbitan ester anticorrosive agent.

EXAMPLES

The present invention will be further described in the following examples.

Examples 1 to 6 for Anticorrosive Compositions

A carbonic ester which comprises an organic carbonate compound having branched alkyl groups of 13 to 15 carbon atoms represented by the following formula:

$$\underset{CH_3(CH_2)_{10}}{\overset{CH_3}{\diagdown}}CHCH_2-O-\underset{\underset{O}{\|}}{C}-O-CH_2CH\overset{CH_3}{\diagup}\underset{(CH_2)_{11}CH_3}{\diagdown}$$

and a sorbitan ester anticorrosive agent were mixed in a vessel in the respective amounts shown in Table 1 and homogenized-by heating at a temperature of 25 to 50° C. with stirring until a thoroughly liquid product was formed as an anticorrosive composition.

The ratio of each component of the anticorrosive compositions is shown in Table 1.

TABLE 1

| | anticorrosive additive | added amount (vol. %) | component (vol. %) |
|---|---|---|---|
| Ex. 1 | (A) | 3 | carbonic ester 97% |
| Ex. 2 | (B) | 3 | carbonic ester 97% |
| Ex. 3 | (C) | 3 | carbonic ester 97% |
| Ex. 4 | (A) + (B) + (C) | 1 | carbonic ester 99% |
| Ex. 5 | (A) + (B) + (C) | 5 | carbonic ester 95% |
| Ex. 6 | (A) + (B) + (C) | 15 | carbonic ester 85% |
| Comparative Example | barium sulfonate | 3 | diester 97% |

(A): sorbitan monolaurate
(B): sorbitan tristearate
(C): sorbitan monooleate

Comparative Example

For comparison, a conventional diester anticorrosive agent was used. The result is shown in Table 1.

Examples for Anticorrosive Solvent Compositions

Anticorrosive compositions prepared according to the above mentioned Examples 1 to 6 were added in an amount of 1% by volume to a fluorine-containing solvent as a volatile solvent and used to wash and treat the surface of a bearing. The result of outgas generation under a test condition as described below is shown in Table 2.

TABLE 2

| system Ex. | heat treatment | Ex. 1 | Ex.2 | Ex. 3 | Ex. 4 | Ex. 5 | Ex. 6 | Comp. |
|---|---|---|---|---|---|---|---|---|
| DHS | ① | A○ | A○ | A○ | A○ | A○ | C○ | D○ |
| 85° C. | ② | A○ | A○ | A○ | A○ | A○ | A○ | D○ |
| *3 h | ③ | A○ | A○ | A○ | A○ | A○ | A○ | D○ |
| SHS | ① | A○ | A○ | A○ | A○ | A○ | B○ | D○ |
| 85° C. | ② | A○ | A○ | A○ | A○ | A○ | A○ | A○ |
| *16 h | ③ | A○ | A○ | A○ | A○ | A○ | A○ | A○ |

(system)
DHS: dynamic head space method
SHS: static head space method
(heat treatment)
①: no baking
②: for 5 hours at 90° C.
③: for 12 hours at 90° C.

Outgas Test Condition:

1. Each anticorrosive composition was subjected to the following baking treatment: ①: no baking; ②: for 5 hours at 90° C. and ③: for 12 hours at 90° C. Three kinds of test samples were thus prepared from each of the same composition. The term "baking" means heat treatment. In Table 2, "h" represent treating hours.

2. Outgas was trapped by the following two methods.
   (a) Generated out gas trapped by dynamic head space method (DHS) at 85° C. for three hours and analyzed by gas chromatography (GC/MS) to determine the quantity thereof.
   (b) Generated out gas trapped by static head space method (SHS) at 85° C. for 16 hours and analyzed by gas chromatography (GC/MS) to determine the quantity thereof.

The quantity of outgas was evaluated by the following grades:

A gas generation less than 100 ng/mg (excellent)
B gas generation of 101 to 200 ng/mg (good)
C gas generation of 201 to 500 ng/mg (passable)
D gas generation more than 501 ng/mg (failure)

Corrosion inhibition was evaluated as in the following:
○ excellent
Δ passable
× failure It is clearly confirmed from the results shown in Tables 1 and 2 that outgas generation from bearings treated by the present composition is greatly controlled compared with conventional ones.

What is claimed is:

1. An anticorrosive solvent composition for a memory unit bearing comprising 1 to 10% by volume of an anticorrosive composition which comprises a carbonic ester of the following formula:

$$R-O-\underset{\underset{O}{\|}}{C}-O-R'$$

wherein R and R' may be the same or different and independently represent a branched alkyl group having 13 to 15 carbon atoms and an adsorption anticorrosive agent, and 90 to 99% by volume of a volatile solvent.

2. The anticorrosive solvent composition for a memory unit bearing according to claim 1, wherein R and R' may be the same or different and independently are represented by the following formula, and n is an integer of 13 to 15 and m is an integer of 0 to 6, $$\begin{array}{c} CH_3(CH_2)_m \\ \phantom{CH_3(CH_2)_m}\diagdown \\ \phantom{CH_3(CH_2)_m}CHCH_2- \\ \phantom{CH_3(CH_2)_m}\diagup \\ CH_3(CH_2)_{n-m-4} \end{array}$$

3. An anticorrosive solvent composition for a memory unit bearing comprising 1 to 10% by volume of an anticorrosive composition which comprises a carbonic ester of the following formula:

$$R-O-\underset{\underset{O}{\|}}{C}-O-R'$$

wherein R and R' may be the same or different and independently represent a branched alkyl group having 13 to 15 carbon atoms and a sorbitan ester, and 90 to 99% by volume of a volatile solvent.

4. The anticorrosive solvent composition according to claim 3, wherein the sorbitan ester is one or more members selected from the group consisting of sorbitan monolaurate, sorbitan trilaurate, sorbitan monostearate, sorbitan tristearate, sorbitan monooleate and sorbitan trioleate.

5. An anticorrosive solvent composition for a memory unit bearing comprising 1 to 10% by volume of an articorrosive composition which comprises a carbonic ester of the following formula:

$$R-O-\underset{\underset{O}{\|}}{C}-O-R'$$

wherein R and R' may be the same or different and independently represent a branched alkyl group having 13 to 15 carbon atoms and an anticorrosive agent containing a carboxyl acid and a sulfonate, and 90 to 99% by volume of a volatile solvent.

6. A memory unit bearing or bearing part having an anticorrosive protection film formed on a surface thereof by an anticorrosion solvent composition comprising 1, to 10% by volume of an anticorrosion composition which comprises a carbonic ester of the following formula:

$$R-O-\underset{\underset{O}{\|}}{C}-O-R'$$

wherein R and R' may be the same or different and independently represent a branched alkyl group having 13 to 15 carbon atoms and a sorbitan ester, and 90 to 99% by volume of a volatile solvent.

7. A spindle motor or hard disk unit in which a memory unit bearing or bearing part is contained and having an anticorrosion protection film formed on a surface thereof by an anticorrosion solvent composition comprising 1 to 10% by volume of an anticorrosion composition which comprises a carbonic ester of the following formula:

$$R-O-\underset{\underset{O}{\|}}{C}-O-R'$$

wherein R and R' may be the same or different and independently represent a branched alkyl group having 13 to 15 carbon atoms and a sorbitan ester, and 90 to 99% by volume of a volatile solvent.

8. An anticorrosive solvent composition for a memory unit bearing consisting essentially of 1 to 10% by volume of an anticorrosive composition which consists of a carbonic ester of the following formula:

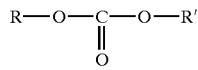

wherein R and R' may be the same or different and independently represent a branched alkyl group having 13 to 15 carbon atoms and an adsorption anticorrosive agent, and 90 to 99% by volume of a fluorine-containing solvent.

9. The anticorrosive solvent composition for a memory unit bearing according to claim 8, wherein R and R' may be the same or different and independently are represented by the following formula, and n is an integer of 13 to 15 and m is an integer of 0 to 6,

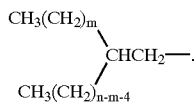

10. The anticorrosive solvent composition of claim 8, wherein said anticorrosive solvent composition consists of the anticorrosive composition and the fluorine-containing solvent.

11. An anticorrosive solvent composition for a memory unit bearing consisting essentially of 1 to 10% by volume of an anticorrosive composition which consists of a carbonic ester of the following formula:

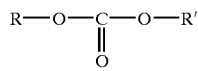

wherein R and R' may be the same or different and independently represent a branched alkyl group having 13 to 15 carbon atoms and a sorbitan ester, and 90 to 99% by volume of a fluorine-containing solvent.

12. The anticorrosive solvent composition according to claim 11, wherein the sorbitan ester is one or more members selected from the group consisting of sorbitan monolaurate, sorbitan trilaurate, sorbitan monostearate, sorbitan tristearate, sorbitan monooleate and sorbitan trioleate.

13. The anticorrosive solvent composition of claim 11, wherein said anticorrosive solvent composition consists of the anticorrosive composition and the fluorine-containing solvent.

14. The anticorrosive solvent composition of claim 11, wherein said anticorrosive composition consists of from 1 to 15 vol. % of the sorbitan ester and 99 to 85 vol. % of the carbonic ester.

15. The anticorrosive solvent composition of claim 14, wherein said carbonic ester has the following formula:

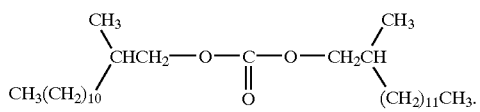

16. An anticorrosive solvent composition for a memory unit bearing consisting essentially of 1 to 10% by volume of an anticorrosive composition which consists of a carbonic ester of the following formula:

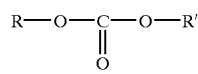

wherein R and R' may be the same or different and independently represent a branched alkyl group having 13 to 15 carbon atoms and an anticorrosive agent consisting of a carboxylic acid and a sulfonate, and 90 to 99% by volume of a fluorine-containing solvent.

17. The anticorrosive solvent composition of claim 16, wherein said anticorrosive solvent composition consists of the anticorrosive composition and the fluorine-containing solvent.

18. A memory unit bearing or bearing part having an anticorrosion protection film formed on a surface thereof by means of an anticorrosive solvent composition consisting essentially of 1 to 10% by volume of an anticorrosive composition which consists of a carbonic ester of the following formula:

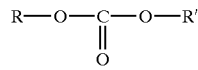

wherein R and R' may be the same or different and independently represent a branched alkyl group having 13 to 15 carbon atoms and a sorbitan ester, and 90 to 99% by volume of a fluorine-containing solvent.

19. The memory unit bearing or bearing part of claim 18, wherein said anticorrosive solvent composition consists of the anticorrosive composition and the fluorine-containing solvent.

20. A spindle motor or hard disk unit in which a memory unit bearing or bearing part is contained and having an anticorrosion protection film formed on a surface thereof by means of an anticorrosive solvent composition consisting essentially of 1 to 10% by volume of an anticorrosive composition which consists of a carbonic ester of the following formula:

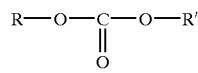

wherein R and R' may be the same or different and independently represent a branched alkyl group having 13 to 15 carbon atoms and a sorbitan ester, and 90 to 99% by volume of a fluorine-containing solvent.

21. The spindle motor or hard disk unit of claim 20, wherein said anticorrosive solvent composition consists of the anticorrosive composition and the fluorine-containing solvent.

* * * * *